US012209635B2

(12) United States Patent
Baatz

(10) Patent No.: US 12,209,635 B2
(45) Date of Patent: Jan. 28, 2025

(54) CONNECTOR ASSEMBLY FOR CONNECTING A ROPE TO A TUBULAR FRAME

(71) Applicant: Kompan A/S, Odense SØ (DK)

(72) Inventor: Asger Baatz, Odense SØ (DK)

(73) Assignee: Kompan A/S, Odense SØ (DK)

( * ) Notice: Subject to any disclaimer, the term of this patent is extended or adjusted under 35 U.S.C. 154(b) by 133 days.

(21) Appl. No.: 18/245,102

(22) PCT Filed: Sep. 14, 2021

(86) PCT No.: PCT/EP2021/075179
§ 371 (c)(1),
(2) Date: Mar. 13, 2023

(87) PCT Pub. No.: WO2022/053702
PCT Pub. Date: Mar. 17, 2022

(65) Prior Publication Data
US 2023/0366447 A1    Nov. 16, 2023

(30) Foreign Application Priority Data
Sep. 14, 2020   (DK) .................................. 2020 01033

(51) Int. Cl.
*F16G 11/12*     (2006.01)
*A63B 9/00*      (2006.01)
*F16G 11/02*     (2006.01)

(52) U.S. Cl.
CPC ................ *F16G 11/12* (2013.01); *A63B 9/00* (2013.01); *F16G 11/025* (2013.01); *A63B 2009/004* (2013.01)

(58) Field of Classification Search
CPC .......... F16G 11/12; F16G 11/025; A63B 9/00; A63B 2009/004; A63B 5/00; A63B 5/11;
(Continued)

(56) References Cited

U.S. PATENT DOCUMENTS 2,725,657 A * 12/1955 Wiederhold ........... A01K 77/00
43/12
3,072,429 A * 1/1963 Stipan ..................... F16G 11/00
294/119.2
(Continued)

FOREIGN PATENT DOCUMENTS

AU     2010212321 A1    2/2011
DE    202016101060 U1   4/2016
(Continued)

OTHER PUBLICATIONS

Search Report and Written Opinion issued in International Application No. PCT/EP2021/075179 on Jan. 17, 2022 (9 pages).
(Continued)

*Primary Examiner* — Garrett K Atkinson
(74) *Attorney, Agent, or Firm* — Bookoff McAndrews, PLLC

(57) ABSTRACT

A connector assembly for fastening a rope to a tubular frame includes a pair of sleeves extending inside the tubular frame through a pair of aligned holes. Each sleeve has a flange portion disposed outside the tubular frame and a tubular portion arranged inside the tubular frame. Each sleeve includes a pair of clips biased outwardly of the tubular portion and engaged with an inner surface of the tubular frame. Also, the connecting assembly includes an elongated member coupled with the rope, and extending inside of a first sleeve through a second sleeve. A nut member has a cap portion engaged with the flange portion of the first sleeve, and a hollow cylindrical portion extending inside the first sleeve. The elongated member is disposed, partly, inside and in threaded engagement with the hollow cylindrical portion.

12 Claims, 5 Drawing Sheets

(58) Field of Classification Search
CPC ....... A63B 21/02; A63B 21/00; A63B 21/023; A63B 21/026; F16B 19/02; F16B 21/073; B25B 31/00
See application file for complete search history.

(56) References Cited

U.S. PATENT DOCUMENTS

| | | | | | |
|---|---|---|---|---|---|
| 3,595,202 | A | * | 7/1971 | Visitacion | ................ G09F 17/00 52/146 |
| 5,228,202 | A | * | 7/1993 | Liao | .................... A01G 3/0255 30/296.1 |
| 5,452,888 | A | * | 9/1995 | Glenn | .................. A63B 43/007 473/576 |
| 6,155,937 | A | * | 12/2000 | Alter | .................... A63B 71/028 473/415 |
| 6,659,893 | B1 | * | 12/2003 | Campbell | .......... A63B 69/0095 473/459 |
| 2009/0314149 | A1 | * | 12/2009 | Clark, II | ............... E21B 29/002 83/651.1 |
| 2010/0301297 | A1 | * | 12/2010 | Chapman | ............ E04G 21/3219 256/47 |
| 2010/0326007 | A1 | * | 12/2010 | Silber | ................. E04G 23/0218 52/742.14 |
| 2013/0256203 | A1 | * | 10/2013 | Schultz | ................. E04H 4/1254 210/167.19 |
| 2014/0138596 | A1 | * | 5/2014 | Ross | ....................... F16G 11/04 256/47 |
| 2019/0346019 | A1 | * | 11/2019 | Jones | ...................... F16G 11/12 |

FOREIGN PATENT DOCUMENTS

| | | |
|---|---|---|
| EP | 3396083 A1 | 10/2018 |
| ES | 2308537 T3 | 12/2008 |
| KR | 100671248 B1 | 1/2007 |
| WO | 2004037492 A1 | 5/2004 |
| WO | 2017042071 A1 | 3/2017 |

OTHER PUBLICATIONS

Search Report issued in Denmark Application No. PA 2020 01033 on Feb. 22, 2021 (4 pages).

* cited by examiner

CONNECTOR ASSEMBLY FOR CONNECTING A ROPE TO A TUBULAR FRAME

CROSS-REFERENCE TO RELATED APPLICATIONS

This application is a U.S. National Stage entry under 35 U.S.C. § 371 of International Application No. PCT/EP2021/075179, filed on Sep. 14, 2021, which claims priority to Denmark Application No. PA 2020 01033, filed on Sep. 14 2020.

TECHNICAL FIELD OF THE INVENTION

The present disclosure generally relates to a connector assembly. More specifically, the disclosure relates to a connector assembly for connecting a rope to a tubular frame and said connector assembly being suitable for adjusting a tension of the rope.

BACKGROUND OF THE INVENTION

Connecting ropes to frame members is well known in the art. Such structures are often found in playgrounds where a structural frame is erected and then a rope net structure is connected to and suspended by the frame.

In a simple embodiment, the rope members are tied to the frame member or to a hook or eye bolt attached to the frame. In other prior art structures, a rope member is passed through a through opening in a frame, and then a knot is made on the "back" side of the frame or a stopper element is attached to the portion of the rope extending past the back side of the frame. In other prior art embodiments, a fastening element is attached to the end of a rope, said fastening element being arranged to be fastened to a cooperating fastening element on the frame.

Rope structures have recently become larger and larger and assembling such structures with the known connectors is complex and time consuming. Furthermore, in many cases, it is difficult to adjust the tension of the ropes via the prior art type connection systems. One attempt to solve this problem is disclosed in US2019346019. This document discloses a mechanism to adjust the tension in a rope in an easier manner. However, the system proposed by US2019346019 is not optimal and can be improved.

SUMMARY OF THE INVENTION

It is therefore a first aspect of the current invention to provide a connector assembly which allows a fast connection.

A second aspect of the current invention is to provide a connector assembly which allows a simple adjustment of the tensions in the ropes connected to the frame member.

These aspects are provided at least in part by a connector assembly according to claim 1. According to claim 1, a connector assembly for fastening a rope to a tubular frame is provided. The tubular frame has a body defining an inner surface, an outer surface, and a pair of aligned holes extending through the body from the inner surface to the outer surface. The connector assembly includes a pair of sleeves configured to extend inside the tubular frame through the pair of aligned holes. Each sleeve has a flange portion configured to be disposed outside the tubular frame and abut the outer surface of the body, and a tubular portion adapted to be arranged inside the tubular frame. Each sleeve further includes a pair of clips extending from the tubular portion and biased outwardly of the tubular portion. The pair of clips is configured to move in a radial direction and is adapted to abut an inner surface of the tubular frame. Also, the connecting assembly includes an elongated member configured to couple with the rope. The elongated member is configured to extend to an inside of a first sleeve of the pair of sleeves through a second sleeve of the pair of sleeves. Furthermore, the connecting assembly includes a nut member having a cap portion adapted to be arranged outside the first sleeve and engaged with the flange portion of the first sleeve, and a hollow cylindrical portion configured to extend inside the first sleeve. The elongated member is configured to be disposed, partly, inside and in threaded engagement with the hollow cylindrical portion of the nut member.

In an embodiment, the first sleeve has a pair of fingers extending from the tubular portion and biased inwardly of the tubular portion and adapted to move in the radial direction. Each finger of the first sleeve includes a protrusion extending radially inwardly from an inner surface of the finger. Further, the hollow cylindrical portion defines a groove extending radially inwardly from an outer surface of the hollow cylindrical portion to receive the protrusion of each finger of the first sleeve. In this way, the fingers of the first sleeve, lock the nut member inside the first sleeve and prevent it from displacing longitudinally, while still permitting rotation.

In one embodiment, the elongated member includes a ferrule adapted to be attached to the rope and configured to extend inside the second sleeve. The elongated member also includes a threaded rod extending from the ferrule and adapted to be arranged, at least partly, inside and in threaded engagement with the hollow cylindrical portion disposed inside the first sleeve.

According to one embodiment, the second sleeve comprises a pair of fingers extending from the tubular portion and biased inwardly of the tubular portion and adapted to move in the radial direction, the fingers of the second sleeve engaging with the elongated member, the ferrule includes a pair of recesses to receive the pair of fingers of the second sleeve to prevent a rotation of the elongated member inside the second sleeve. In one embodiment, the recesses of the pair of recesses are arranged along the longitudinal axis of the second sleeve.

In one embodiment, the second sleeve comprises at least one finger extending from the tubular portion and biased inwardly of the tubular portion and adapted to move in the radial direction, the finger of the second sleeve engaging with the elongated member to increase the friction between the elongated member and the second sleeve.

In one embodiment, the second sleeve comprises a pair of fingers extending from the tubular portion and biased inwardly of the tubular portion and adapted to move in the radial direction; the fingers of the second sleeve engaging with the elongated member such that the fingers of the second sleeve press against an outer surface of the ferrule to hold the elongated member within the second sleeve, and thereby restrict an easy sliding or turning of the elongated member relative to the second sleeve. In this embodiment, the ferrule is not completely prevented from rotating by the fingers, but rotation is made more difficult.

In one embodiment, the first and second sleeves are identical. In this way fewer unique parts need to be manufactured and kept in stock.

In one embodiment, the nut member is rotatable within the first sleeve and relative to the elongated member to move the elongated member linearly inside the nut member to adjust a tension of the rope.

In an embodiment, the cap portion of the nut member includes a torsion applying arrangement, for example a plurality of holes disposed spaced apart and extending in a longitudinal direction. The torsion applying arrangement is adapted to receive a tool to facilitate a rotation of the nut member inside the first sleeve. Other examples of a torsion applying arrangement are hex shaped recesses, hex shaped protrusions, etc.

In accordance with an embodiment, the connector assembly further includes a cover member adapted to be coupled to the cap portion of the nut member to cover the torsion applying arrangement of the cap portion. In one embodiment, the cover member is arranged with a locking element to prevent easy removal of the cover member from the nut member.

According to an embodiment, the flange portions of the sleeves extend radially outwardly of the tubular portion.

In an embodiment, each clip of each of the pair of sleeves is connected to the tubular portion of the corresponding sleeve and extends towards the flange portion of the corresponding sleeve in a longitudinal direction. Also, in one embodiment, each finger of each of the pair of sleeves is connected to the tubular portion of the corresponding sleeve and extends away from the flange portion of the corresponding sleeve in the longitudinal direction.

In one embodiment, the tubular portion of each sleeve of the pair of sleeves includes a pair of cut-outs to receive the pair of clips of the corresponding sleeve to facilitate an insertion of the tubular portion inside the tubular frame. In one embodiment, the tubular portion of each sleeve of the pair of sleeves includes a pair of slots to receive the pair of fingers of the corresponding sleeve to facilitate an insertion of the nut member or the elongated member inside the corresponding sleeve.

In one embodiment, the tubular frame, the nut member and/or the elongated member are made of metal while the first and second sleeves are made of plastic. In this way, the material of the nut and elongated member are separated from the material of the tubular frame by the plastic sleeves. In one embodiment, the sleeves are injection moulded.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

Figure 1:
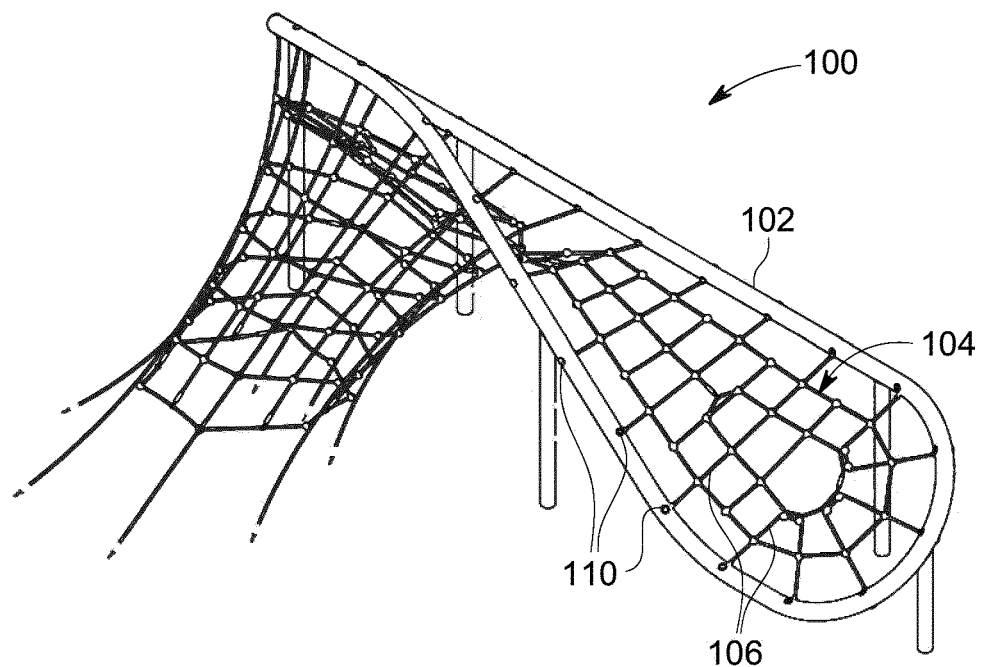
FIG. 1 shows a playground structure having a tubular frame and a net structure having a plurality of ropes connected to the tubular frame via exemplary connector assemblies according to an embodiment of the current invention.
Figure 2:
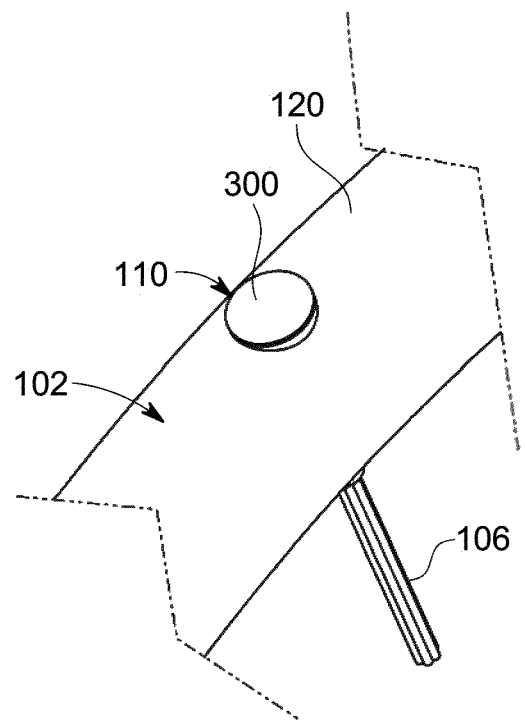
FIG. 2 shows an enlarged view of a portion of the playground structure of FIG. 1 depicting the connector assembly attached to the tubular frame and a rope.
Figure 3:
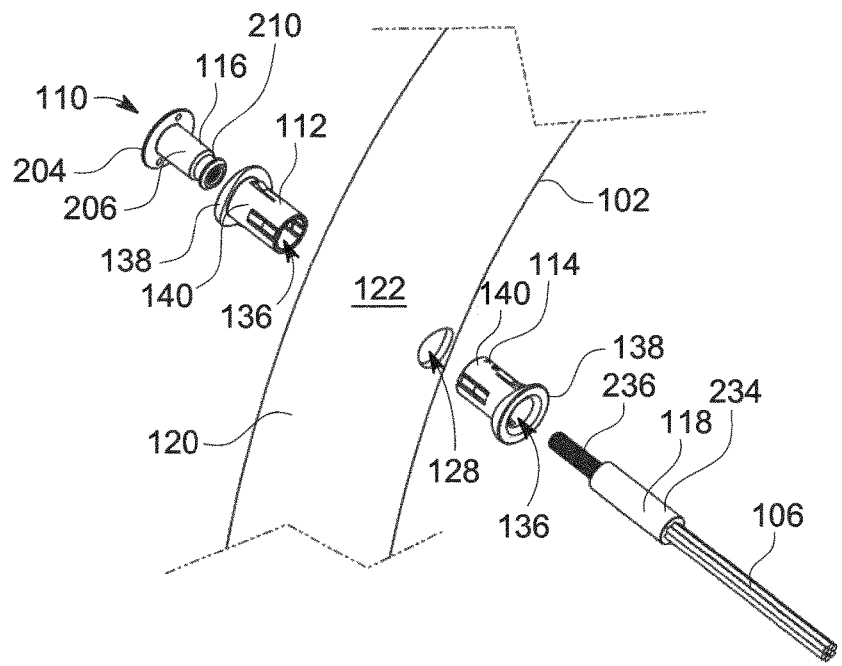
FIG. 3 shows an exploded view of the connector assembly of FIG. 2.
Figure 4:
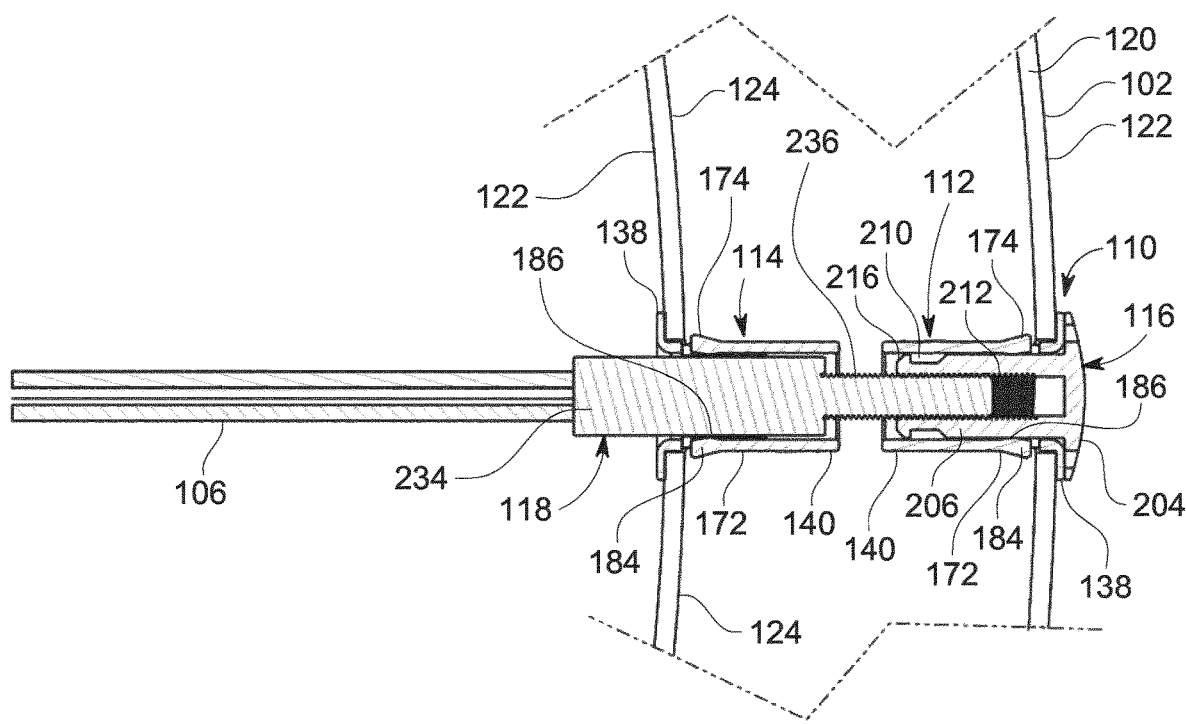
FIG. 4 shows a sectional view of the connector assembly engaged with the tubular frame and the rope depicting a plurality of clips of each of the pair of sleeves disposed inside the tubular frame.
Figure 5:
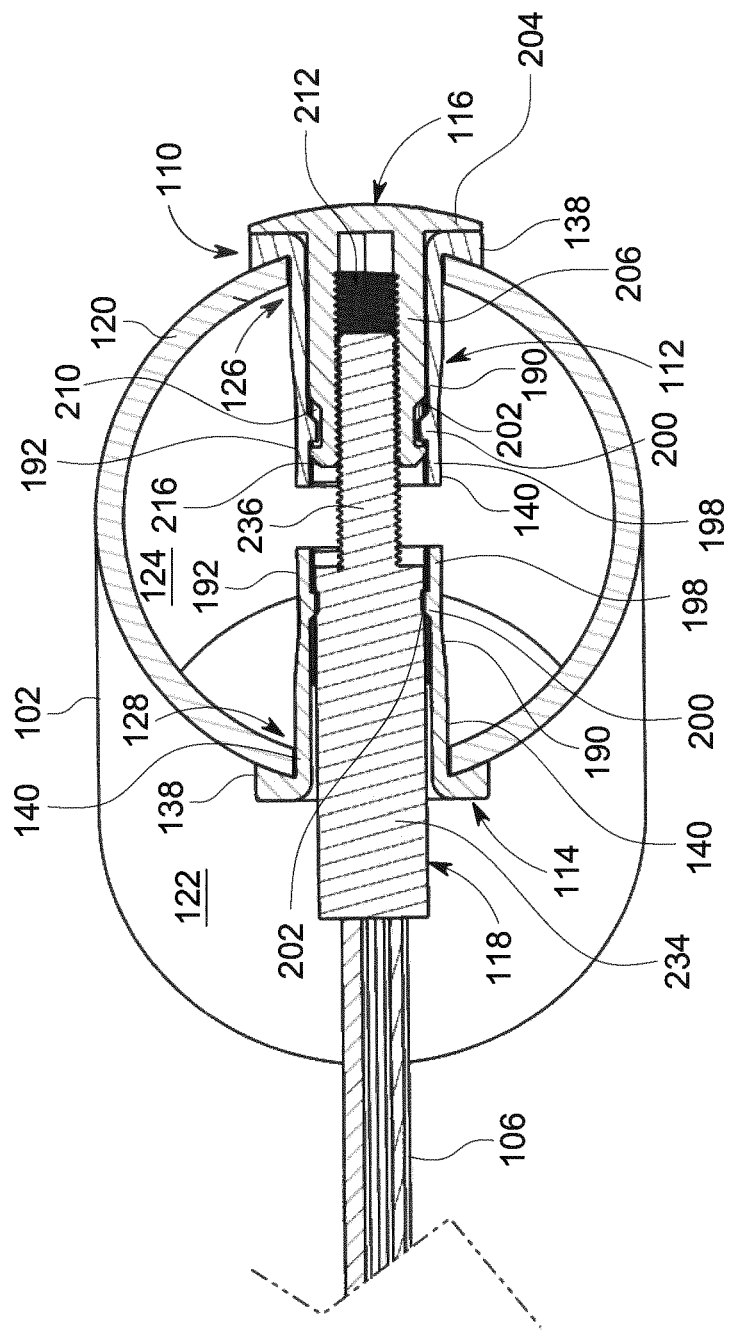
FIG. 5 shows a sectional view of the connector assembly engaged with the tubular frame and the rope depicting a plurality of fingers of each of the pair of sleeves in engagement with a nut member and an elongated member.

Referring to FIG. 1, an exemplary playground structure 100 suitable for facilitating a playing of children is shown. The playground structure 100 includes a frame, for example, a tubular frame 102, and a net structure 104 having a plurality of ropes 106 connected to the tubular frame 102. As shown in FIG. 2, One or more ropes 106 of the net structure 104 is connected/attached/clamped to the tubular frame 10 by using a connector assembly 110. Referring to FIGS. 3, 4, and 5. The connector assembly 110 includes a pair of sleeves, for example, a first sleeve 112 and a second sleeve 114, adapted to extend, partially, inside the tubular frame 102, a nut member 116 adapted to extend, partially, inside one of the pair of sleeves, for example, the first sleeve 112, and an elongated member 118 attached to an end of the rope 106 and adapted to extend through other of the sleeve, for example, the second sleeve 114, and engage with the nut member 116 to enable the attachment/connection of the rope 106 with the tubular frame 102.

To facilitate the engagement/attachment/coupling of the connector assembly 110 with the tubular frame 106, the tubular frame 102 includes a body 120 having an outer surface 122, an inner surface 124, and a pair of aligned holes, for example, a first hole 126 (shown in FIG. 5) and a second hole 128 (best shown in FIG. 3) disposed opposite to the first hole 126 and having a central axis aligned with a central axis of the first hole 126. Each of the first hole 126 and the second hole 128 extend through the body 120 from the outer surface 122 to the inner surface 124. As shown in FIG. 4 and FIG. 5, the first sleeve 112 is adapted to extend inside the tubular frame 102 through the first hole 126, while the second sleeve 114 may extend inside the tubular frame 102 through the second hole 128. In an assembly of the first sleeve 112 and the second sleeve 114 with the tubular frame 102, a central axis of the first sleeve 112 is aligned/in-line with a central axis of the second sleeve 114. It may be appreciated that a structure, a construction, and an assembly of the first sleeve 112 and the second sleeve 114 are identical, and therefore, for the sake of clarity and brevity, the structure, the construction, and the assembly of only the first sleeve 112 is explained. Further, it may be noted that similar reference numerals are used for similar structural features of the first sleeve 112 and the second sleeve 114.

Referring to the FIGS. 3 to 7, the first sleeve 112 includes a body 130 having a first longitudinal end 132, a second longitudinal end 134, and defining a through hole 136 extending from the first longitudinal end 132 to the second longitudinal end 134. The body 130 includes a flange portion 138 and a tubular portion 140 extending from the second longitudinal end 134 to the flange portion 138. The flange portion 138 may extend from the first longitudinal end 132 to the tubular portion 140, and is adapted to be arranged outside the tubular frame 102 and abut the outer surface 122 of the tubular frame 102. The tubular portion 140 is adapted to extend inside the tubular frame 102 when the first sleeve is inserted inside the tubular frame 102 through the first hole 102. As shown, an outer diameter of the flange portion 138 is larger than an outer diameter of the tubular portion 140, defining a step 142 at the interface of the flange portion 138 and the tubular portion 140. Accordingly, the flange portion 138 extends radially outwardly of the tubular portion 140. The step 142 is configured to abut the outer surface 122 of the tubular frame 102. Further, the outer diameter of the tubular portion 140 is substantially equal to a diameter of the first hole 126, thereby ensuring a secure engagement and retention of the tubular portion 140 within the tubular frame 102.

Moreover, the tubular portion 140 defines a pair of cut-outs, for example, a first cut-out 144 and a second cut-out 146 (best shown in FIG. 7) arranged diametrically opposite to the first cut-out 144, disposed proximate to the flange portion 138. The first cut-out 144 and the second cut-out 146, each extends in longitudinal direction and extends from an outer surface 148 to an inner surface 150. The first cut-out 144 includes a first end 152 disposed proximate to the flange portion 138 and a second end 154 disposed distally from the flange portion 138 (i.e. step 142). Similarly, the second cut-out 146 includes a first end 156 (shown in FIG. 7) disposed proximally to the step 142 and a second end 158 (shown in FIG. 7) arranged distally from the step 142 or the flange portion 138. In an embodiment, the first cut-out 144 and the second cut-out 146 are arranged such that the entire first cut-out 144 and the entire second cut-out 146 extend inside the tubular frame 102 when the first sleeve 112 is inserted inside the tubular frame 102, and is engaged to the tubular frame 102 such that the step 142 (i.e. the flange portion 138) abuts the outer surface 122 of the tubular frame 102.

Figure 6:
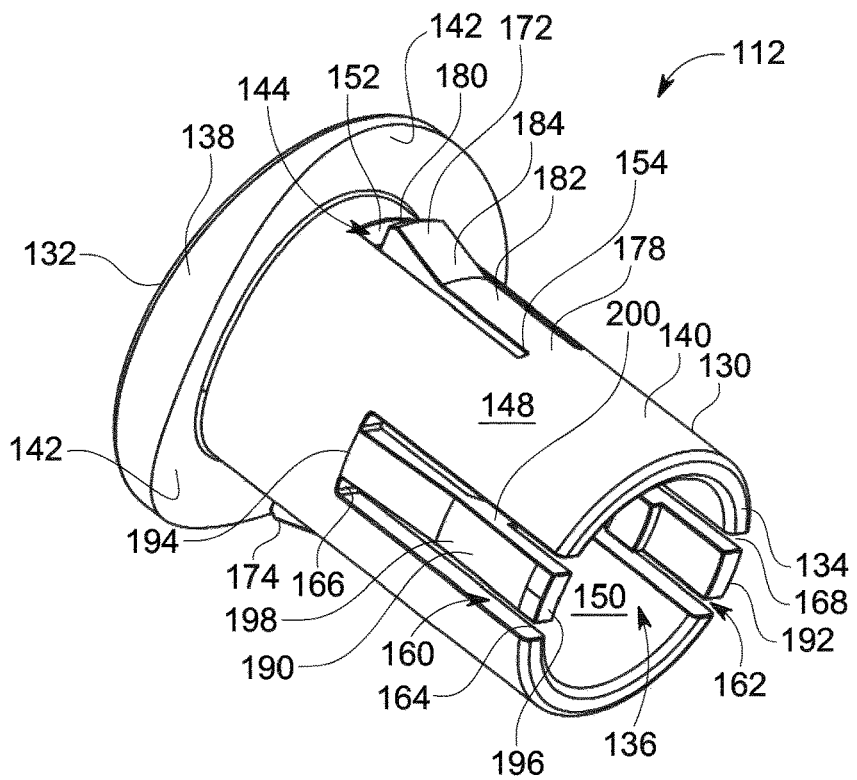
FIG. 6 shows a perspective view of a first and/or second sleeve of the connector assembly of FIG. 3.
Figure 7:
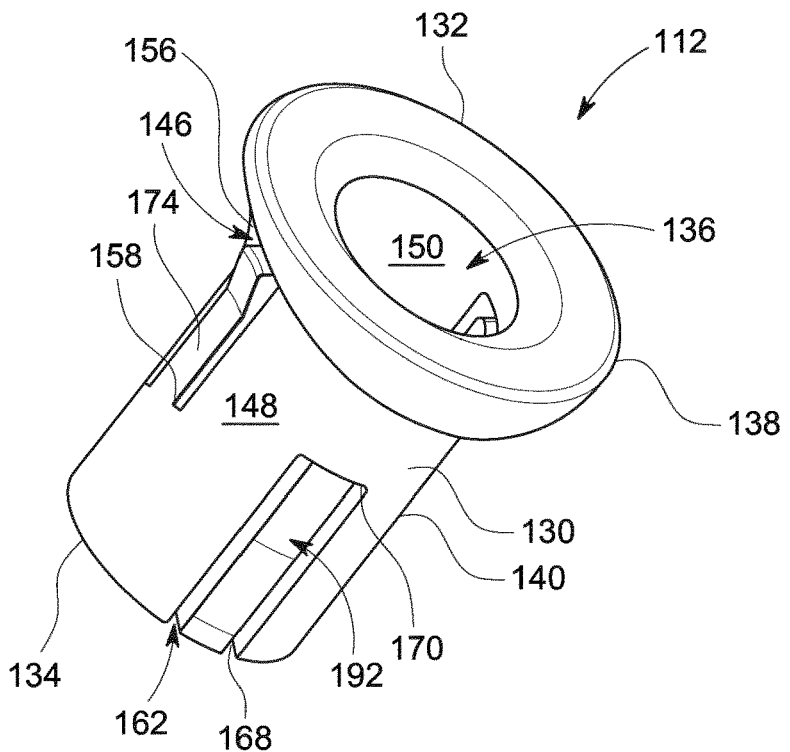
FIG. 7 shows another perspective view of the first and/or second sleeve of the connector assembly of FIG. 3.
Figure 8:
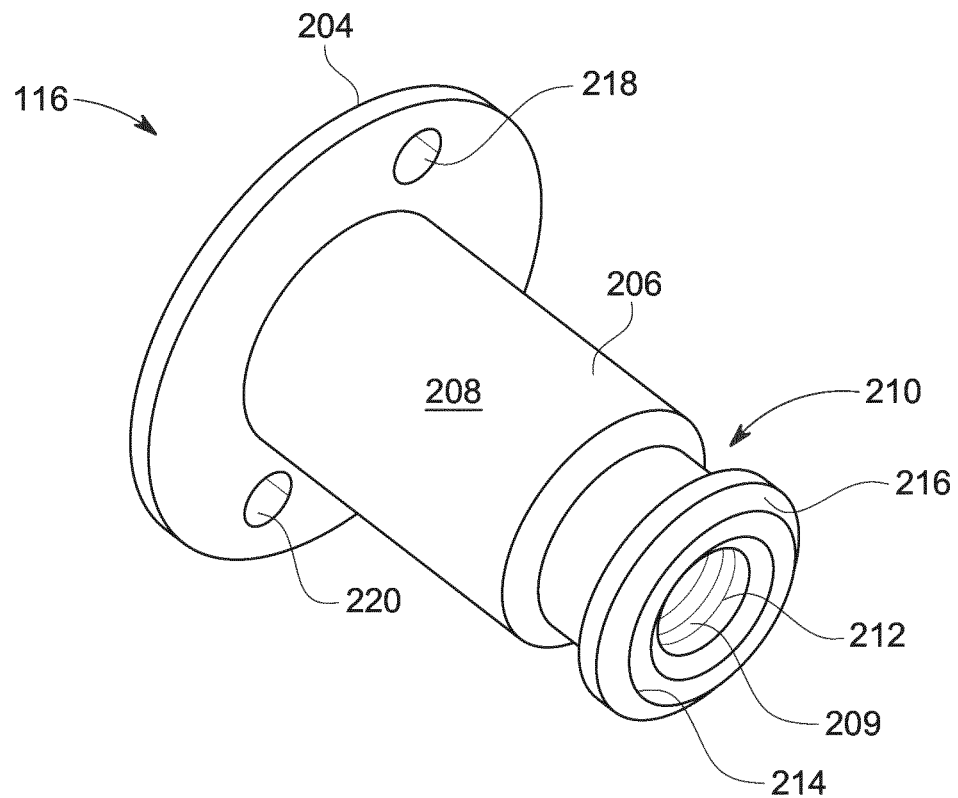
FIG. 8 shows a perspective view of the nut member of the connector assembly of FIG. 3.
Figure 9:
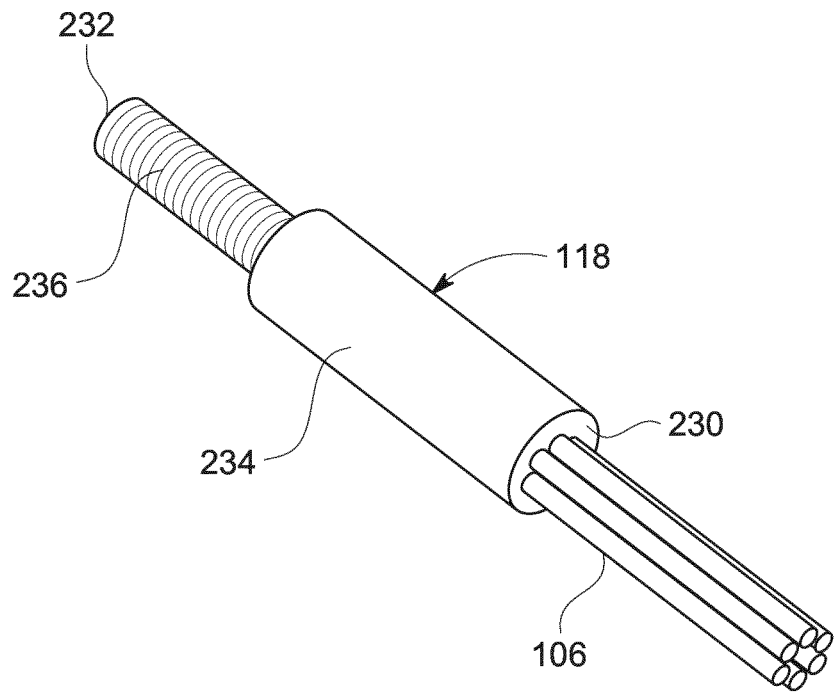
FIG. 9 shows a perspective view of the elongated member of the connector assembly of FIG. 3 depicting the rope connected with a ferrule of the elongated member.

Further, as shown in FIGS. 6 and 7, the tubular portion 140 defines a pair of slots, for example, a first slot 160 and a second slot 162 arranged diametrically opposite to the first slot 160, disposed proximate to the second longitudinal end 134. The first slot 160 and the second slot 162, each extends from the outer surface 148 to the inner surface 150. The first slot 160 extends in a longitudinal direction and includes a first end 164 disposed proximate to the second longitudinal end 134 and a second end 166 disposed distally from the second longitudinal end 134. Similarly, the second slot 162 includes a first end 168 disposed at the second longitudinal end 134 and a second end 170 (shown in FIG. 7) arranged distally from the second longitudinal end 134. In an embodiment, the first slot 160 and the second slot 162 are arranged such that the entire first slot 160 and the entire second slot 162 extend inside the tubular frame 102 when the first sleeve 112 is arranged inside the tubular frame 102 and the step 142 (i.e. the flange portion 138) abuts the outer surface 122 of the tubular frame 102. Further, as shown, the pair of slots 160, 162 and the pair of the cut-outs 144, 146 are arrayed circularly around a central axis of the first sleeve 112, and are arranged spaced apart from each other. In-fact, the pair of slots 160, 162 and the pair of cut-outs 144, 146 are arranged such that each of the pair of slots 160, 162 are arranged adjacent/neighbouring/between the two cut-outs 144, 146, and each of the cut-outs 144, 146 are disposed adjacent/neighbouring/between the two slots 160, 162.

Further, the first sleeve includes a pair of clips, for example, a first clip 172 and a second clip 174 disposed diametrically opposite to the first clip 172, connected to the tubular portion 140 and biased outwardly of the tubular portion 140. The pair of clips 172, 174 are adapted to move in a radial direction and may move, at least partially, inwardly of the tubular portion 140, inside the through hole 136, on application of a compressive force on the clips 172, 174. The pair of clips 172, 174 moves outwardly of the tubular portion 140 on removal of the compressive force. As shown in FIGS. 6 and 7, the first clip 172 extends along the first cut-out 144 and at least partially disposed inside the first-cut-out 144, while the second clip 174 extends along a length of the second cut-out 146, and is at least partially arranged inside the second cut-out 146. A structure, a construction, an assembly, and a function of the first clip 172 and the second clip 174 are identical, and therefore, for the sake of clarity and brevity, the structure, the construction, the assembly, and the function of only the first clip 172 is explained, Referring to FIG. 6, the first clip 172 includes an end 178 connected to the second end 154 of the first cut-out 144 and a free end 180 disposed proximate to the first end 152 of the first cut-out 144. Accordingly, the first clip 172 may extend along a length of the first cut-out 144 from the tubular portion 140 towards the first flange portion 138. Also, the first clip 172 includes a straight portion 182 extending from the end 178 towards the free end 180, and a tapered portion 184 extending obliquely and outwardly from the straight portion 182 to the free end 180. The tapered portion 184 is adapted to be disposed, at least partially, outwardly of the tubular portion 140 in the absence of a compressive force on the first clip 172. Accordingly, the first clip 172 is biased outwardly of the tubular portion 140 to allow an extension of a portion of the tapered portion 184 outside of the tubular portion 140. Further, the first clip 172 is adapted to move radially inwardly through the first cut-out 144 upon application of the compressive force such that the tapered portion 184 moves inside the first cut-out 144 to facilitate an insertion of the first sleeve 112 inside the tubular frame 102 through the first hole 126. Further, the free end 180 of the first clip 172 may abut the inner surface 124 of the tubular frame 102 when the first sleeve 112 is disposed inside the tubular frame 102 to prevent a removal of the first sleeve 112 through the first hole 126. Also, the first clip 172 may include a notch 186 (shown in FIG. 4) connected to the tapered portion 184 and extending inwardly of the tubular portion 140. The notch 186 is adapted to engage with the nut member 116 to retain the nut member 116 inside the first sleeve 112 and to restrict a sliding movement of the nut member 116 within the first sleeve 112.

To retain the nut member 116 inside the first sleeve 112, the first sleeve 112 includes a pair of fingers extending from the tubular portion 140 and biased inwardly of the tubular portion 140 and adapted to the move in the radial direction. The pair of fingers, for example, a first finger 190 and a second finger 192, arranged diametrically opposite to the first finger 190, is connected to the tubular portion 140, and may move, at least partially, outwardly of the tubular portion 140 on application of a radial force. The pair of fingers 190, 192 moves inwardly of the tubular portion 140 on removal of the radial force. As shown in FIGS. 6 and 7, the first finger 190 extends along the first slot 160 and is, at least partially, disposed inside the first slot 160, while the second finger 192 extends along a length of the second slot 162, and is, at least partially, arranged inside the second slot 162. A structure, a construction, an assembly, and a function of the first finger 190 and the second finger 192 are identical, and therefore, for the sake of clarity and brevity, the structure, the construction, the assembly, and the function of only the first finger 190 is explained.

Referring to FIG. 6, the first finger 190 includes an end 194 connected to the second end 166 of the first slot 160, and a free end 196 disposed proximate to the first end 164 of the first slot 160. Accordingly, the first finger 190 may extend along a length of the first slot 160 from the tubular portion 140 towards the second longitudinal end 134 and away from the flange portion 138. Also, the first finger 190 includes an elongated portion 198 extending from the end 194 to the free end 196, and a protrusion 200 extending radially inwardly form the elongated portion 198 and from an inner surface of the first finger 190. The protrusion 200 is adapted to be disposed, at least partially, inwardly of the tubular portion 140 in the absence of an outwardly directed radial force on the first finger 190. Accordingly, the first finger 190 is biased inwardly of the tubular portion 140 to allow an extension of a portion of the protrusion 200 inside the tubular portion 140. Further, the first finger 190 is adapted to move radially outwardly through the first slot 160 upon application of the radial force to move the protrusion 200 inside the first slot 160 to facilitate an insertion of the nut member 116 inside the first sleeve 112. As shown in FIG. 5, the protrusion 200 includes a tapered surface 202 extending obliquely and away from the inner surface of the straight portion 192 to facilitate a smooth movement of the first finger 190 radially outwardly upon a contact and sliding of the nut member 116 along the tapered surface 202 to facilitate an insertion of the nut member 116 inside the first sleeve 112. Further, the protrusion 200 is adapted to engage with the nut member 116 and adapted to be disposed inside a groove 210 of the nut member 116 to prevent a removal of the nut member 116 from the first sleeve 112.

Referring to FIGS. 3, 4, 5, and 8, the nut member 116 is adapted to extend, partly, inside the first sleeve 112 and partly remains outside the first sleeve 112. As shown, the nut member 116 includes a cap portion 204 adapted to be arranged outside the first sleeve 112 and a hollow cylindrical portion 206 configured to extend inside the first sleeve 112. In an assembly, as shown in FIGS. 3 and 4, the cap portion 204 abuts an upper surface of the flange portion 138 of the first sleeve 112 and engages with flange portion 138, while the hollow cylindrical portion 206 is arranged/extend inside the tubular portion 140 (i.e. the first sleeve 112) such that an outer surface 208 of the cylindrical portion 206 abuts the inner surface 150 of the tubular portion 140 of the first sleeve 112. Further, an inner surface 209 of the cylindrical portion 206 includes/defines threads 212 adapted to facilitate a threaded engagement of the nut member 116 with the elongated member 118. Moreover, the outer surface 208 of the cylindrical portion 206 defines the groove 210 extending circularly around a central axis of the nut member 116 and arranged proximate to a first end 214 of the nut member 116 and away from the cap portion 204.

Also, the groove 210 may extend radially inwardly from the outer surface 208 of the cylindrical portion 206, is adapted to receive the protrusions 200 of the pair of fingers 190, 192 of the first sleeve 112 to enable an engagement of the nut member 116 with the first sleeve 112 and to facilitate a retention of the nut member 116 inside the first sleeve 112. Also, due to the extension of the protrusions 200 of the first sleeve 112 within the groove 210, a sliding movement of the nut member 116 along the central axis of the first sleeve 112 is restricted//prevented, thereby restricting or preventing a removal of the nut member 116 from the first sleeve 112. To facilitate an extension of the protrusions 200 of the first sleeve 112 inside the groove 210, the cylindrical portion 206 may include a tapered surface 216 extending obliquely and outwardly towards the groove 210 from the first end 214.

The tapered surface 216 is adapted to slide along the tapered surface 202 of the protrusions 200 of the first sleeve 112, when the nut member 116 is inserted inside the tubular portion 140 (i.e. first sleeve 112), thereby facilitating a smooth movement of the fingers 190, 192 of the first sleeve 112 radially outwardly, and enabling the insertion of the protrusions 200 of the first sleeve 112 inside the groove 210, and therefore locking the nut member 116 inside the first sleeve 112. It may be appreciated that in an assembly of the nut member 116 with the first sleeve 112, the first end 214 of the nut member 116 remains inside the tubular portion 140 of the first sleeve 112 and may be arranged at a distance from the second longitudinal end 134 of the first sleeve 112.

Also, the cap portion 204 includes a torsion applying arrangement—In this embodiment, a plurality of holes 218, 220 is provided extending in a longitudinal direction and adapted to receive a tool to facilitate a rotation of the nut member 116 inside the first sleeve 112. The holes 218, 220 are arranged diametrically opposite to each other and may be arranged at a distance from a centre of the cap portion 204. In an embodiment, the connector assembly 110 may include a cover member 300 (shown in FIG. 2) disposed over the cap portion 204 and covering the holes 218, 220. In an embodiment, the cover member 300 is adapted to be removably coupled to the cap portion 204 to cover the holes 218, 220 of the cap portion 204. In an embodiment, the cover member 300 is non removably attached to the cap portion 204, after inserting the nut member 116 in the first sleeve 112 and engaging the nut member 116 with the elongated member 118, to prevent any unauthorized rotation of the nut member 116 inside the first sleeve 112.

Referring to FIGS. 3, 4, 5, and 9, the elongated member 118 is configured to extend through the second sleeve 114 to an inside of first sleeve 112 and is adapted to engage with the fingers 190, 192 of the second sleeve 114. The elongated member 114 includes a first end 230, a second end 232, a ferrule 234 extending from the first end 230 towards the second end 232, and a threaded rod 236 extending from the ferrule 234 to the second end 232. The ferrule 234 is adapted to be attached to the rope 106 and extend inside the second sleeve 114, while the threaded rod 236 is adapted to extend, at least, partly, outside the second sleeve 114 and extends inside the cylindrical portion 206 of the nut member 116 arranged inside the first sleeve 112. In an assembly, the threaded rod 236 is in a threaded engagement with the threads 212 of the hollow cylindrical portion 206 of the nut member 116. It may be appreciated that the rope 106 may be connected to the ferrule 234 by using any suitable method, such as press fitting, known in the art. Further in an assembly, the protrusions 200 of the fingers 190, 192 of the second sleeve 114 press against an outer surface of the ferrule 234 to hold the elongated member 118 within the second sleeve 114, and thereby restrict an easy sliding or turning of the elongated member 118 relative to the second sleeve 114. Moreover, in an embodiment (not shown), the outer surface of the ferrule 234 may include a knurled/or otherwise friction enhanced surface to enhance a friction between the ferrule 234 and fingers 190, 192 of the second sleeve 114 to restrict a rotation of the elongated member 118 within the second sleeve 114. Further, in an embodiment (not shown), the ferrule 234 may include a pair of recesses or longitudinal grooves to receive protrusions 200 of the pair of fingers 190, 192 of the second sleeve 114 to prevent a rotation of the elongated member 118 inside the second sleeve 114, while still allowing a sliding movement of the elongated member 118 inside the second sleeve 114 in a longitudinal direction to facilitate an adjustment of the tension of the rope 106.

A method for clamping/connecting the rope 106 with the tubular frame 102 using the connector assembly 110 is now described. For clamping the rope 106 with the tubular frame 102, at first, the first sleeve 112 is inserted inside the first hole 126 and engaged with the tubular frame 102 such that the tubular portion 140 of the first sleeve 112 extends inside the tubular frame 102 and the flange portion 138 of the first sleeve 112 is arranged outside the tubular frame 102 and abuts the outer surface 122 of the tubular frame 102. As the tubular portion 140 of the first sleeve 112 is inserted inside the tubular frame 102, through the first hole 126, the tapered portions 184 of the clips 172, 174 of the first sleeve 112 come into contact with the body 120 of the tubular frame 102, and slide along the body 120 as the tubular portion 140 of the first sleeve 112 is extended inside the tubular frame 102, causing the tapered portions 184, and hence clips 172, 174, of the first sleeve 112 to move inwardly of the respective cut-outs 144, 146. The tubular portion 140 of the first sleeve 112 is extended inside the tubular frame 102 until the flange portion 138 of the first sleeve 112 abuts the outer surface 122 of the tubular frame 102. In such a configuration, the tapered portions 184 of the clips 172, 174 of the first sleeve 112 are arranged outwardly of the tubular portion 140. Due to the outward extension of the tapered portions 184, and hence the clips 172, 174, the first sleeve 112 is securely engaged with the tubular frame 102 and an outward movement of the first sleeve 112 to disengage the first sleeve 112 from the first hole 126 is prevented. In an embodiment, the free ends 180 of the clips 172, 174 of the first sleeve 112 may abut the inner surface 124 of the tubular frame 102 when the flange portion 138 of the first sleeve 112 abuts the outer surface 122. Alternatively, the free ends 180 of the clips 172, 174 of the first sleeve 112 may be disposed at a gap from the inner surface 124 when the flange portion 138 abuts the outer surface 122.

Similarly, the second sleeve 114 is engaged with the tubular frame 102 by inserting the tubular portion 140 of the second sleeve 114 inside the tubular frame 102 via the second hole 128. As can be seen in FIGS. 4 and 5, in the assembly, the tubular portion 140 of the second sleeve 114 extends through the second hole 128 and is disposed inside the tubular frame 102 such that the flange portion 138 of the second sleeve 114 abuts the outer surface 122, while the tapered portions 184 of the clips 172, 174 of the second sleeve 114 are arranged outside the tubular portion 140 of the second sleeve 114 and inside the tubular frame 102. Accordingly, the second sleeve 114 is securely engaged with the tubular frame 102 and an outward movement of the second sleeve 114 to disengage/remove the second sleeve 114 from the second hole 128 is prevented.

Subsequently, the nut member 116 is inserted inside the first sleeve 112. The nut member 116 is inserted inside the first sleeve 112 such that cap portion 204 abuts the upper surface of the flange portion 138 of the first sleeve 112.

As the nut member 116 is inserted inside the first sleeve 112, the outer surface 208 of the cylindrical portion 206 may contact the notches 186 of the clips 172, 174, of the first sleeve 112 and may push the clips 172, 174 slightly outwardly. Accordingly, the clips 172, 174 of the first sleeve 112 exert a compressive force on the cylindrical portion 206, thereby restricting an easy sliding of the nut member 116 relative to the first sleeve 112. As the nut member 116 is extended inside the tubular portion 140 of the first sleeve 112, the tapered surface 216 of the nut member 116 may come into contact with the tapered surfaces 202 of the protrusions 200 of the fingers 190, 192 of the first sleeve 112. As the tapered surface 216 slides along the tapered surface 202, the protrusions 200, and hence the fingers 190, 192, of the first sleeve 112 are moved radially outwardly. Upon further insertion of the nut member 116 inside the first sleeve 112, the protrusions 200 of the first sleeve 112 may be disposed in alignment with the groove 210, causing the inward movement of the protrusions 200, and hence the fingers 190, 192 of the first sleeve 112, enabling the extension of the protrusions 200 inside the groove 210. Due to insertion/extension of the protrusions 200 of the first sleeve 112 inside the groove 210, the sliding movement of the nut member 116 in a longitudinal direction and inside the first sleeve 112 is prevented/restricted, while a rotational movement of the nut member 116 inside the first sleeve 112 is allowed.

After inserting the nut member 116 inside the first sleeve 112, the elongated member 118 connected with the rope 106 is inserted inside the tubular frame 102 through the second sleeve 114 such that a portion of the threaded rod 236 is arranged inside the cylindrical portion 206 and the ferrule 234, at least partly, is arranged inside the second sleeve 114. The elongated member 114 is pushed inside the cylindrical portion 206 such that the threaded rod 236 is in contact with the threads 212 of the nut member 116. Also, in the assembly of the ferrule 234 inside the second sleeve 114, the protrusions 200 of the fingers 190 192 of the second sleeve 114 are engaged/abutted with the outer surface of the ferrule 234.

After positioning/inserting the elongated member 118 inside the first sleeve 112 and the second sleeve 114, the nut member 116 is rotated to extend to the threaded rod 236 further inside the cylindrical portion 206 to increase/adjust the tension of the rope 106. As the rope 106 is connected to the net structure 104 which will prevent the rotation of the rope 106/ferrule 234 inside the second sleeve 114 when the nut member 116 is rotated, thereby allowing only the sliding movement of the elongated member 118 inside the second sleeve 114 as the nut is rotated. Also, the friction between the fingers 190, 192 of the second sleeve 114 and the ferrule 234 may also prevent rotation of the elongated member 118. The nut member 116 may be rotated by inserting a tool in the pair of holes 218, 220, then rotating the tool. Subsequent to the proper adjustment of the tension of the rope 106 by rotating the nut member 116, the cover member 300 is engaged with the cap portion 204 to cover the holes 218, 220. In an embodiment, the cover member 300 is secured permanently with the cap portion 204 such that a removal of the cover member 300 from the cap portion 204 may not be possible without damaging the cap portion 204. In this way, any unauthorised access of the nut-member 116 is prevented.

It is to be noted that the figures and the above description have shown the example embodiments in a simple and schematic manner. Many of the specific mechanical details have not been shown since the person skilled in the art should be familiar with these details and they would just unnecessarily complicate this description.

LIST OF ELEMENTS 100 playground structure
102 tubular frame
104 net structure
106 rope
110 connector assembly
112 first sleeve
114 second sleeve 116 nut member
118 elongated member
120 body
122 outer surface
124 inner surface
126 first hole
128 second hole
130 body
132 first longitudinal end
134 second longitudinal end
136 through hole
138 flange portion
140 tubular portion
142 step
144 first cut-out
146 second cut-out
148 outer surface
150 inner surface
152 first end
154 second end
156 first end
158 second end
160 first slot
162 second slot
164 first end
166 second end
168 first end
170 second end
172 first clip
174 second clip
178 end
180 free end
182 straight portion
184 tapered portion
186 notch
190 first finger
192 second finger
194 end
196 free end
198 elongated portion
200 protrusion
202 tapered surface
204 cap portion
206 cylindrical portion
208 outer surface
209 inner surface
210 groove
212 threads
214 first end
216 tapered surface
218 hole
220 hole
230 first end
232 second end
234 ferrule
236 threaded rod
238 recess
240 recess
300 cover member

The invention claimed is:

1. A connector assembly for fastening a rope to a tubular frame, the tubular frame having a body defining an inner surface, an outer surface, and a pair of aligned holes extending through the body from the inner surface to the outer surface, the connector assembly comprises:
   a. a pair of sleeves configured to extend inside the tubular frame through the pair of aligned holes, each sleeve including
      i. a flange portion configured to be disposed outside the tubular frame and abut the outer surface of the body,
      ii. a tubular portion adapted to be arranged inside the tubular frame,
      iii. a pair of clips extending from the tubular portion and biased outwardly of the tubular portion, the pair of clips being configured to move in a radial direction and being adapted to abut an inner surface of the tubular frame, and
   b. an elongated member configured to couple with the rope, the elongated member being configured to extend to an inside of a first sleeve of the pair of sleeves through a second sleeve of the pair of sleeves; and
   c. a nut member having
      i. a cap portion adapted to be arranged outside the first sleeve and engaged with the flange portion of the first sleeve, and
      ii. a hollow cylindrical portion configured to extend inside the first sleeve,
   d. wherein the elongated member is configured to be disposed, partly, inside and in threaded engagement with the hollow cylindrical portion of the nut member.

2. The connector assembly of claim 1, wherein
   a. the first sleeve comprises a pair of fingers extending from the tubular portion and biased inwardly of the tubular portion and adapted to move in the radial direction,
   b. each finger of the first sleeve includes a protrusion extending radially inwardly from an inner surface of the finger; and
   c. the hollow cylindrical portion of the nut member defines a groove extending radially inwardly from an outer surface of the hollow cylindrical portion to receive the protrusion of each finger of the first sleeve.

3. The connector assembly of claim 1, wherein the elongated member includes
   a. a ferrule adapted to be attached to the rope and configured to extend inside the second sleeve, and
   b. a threaded rod extending from the ferrule and adapted to be arranged, at least partly, inside and in threaded engagement with the hollow cylindrical portion of the nut member disposed inside the first sleeve.

4. The connector assembly of claim 3, wherein the second sleeve comprises a pair of fingers extending from the tubular portion and biased inwardly of the tubular portion and adapted to move in the radial direction; the fingers of the second sleeve engaging with the elongated member, the ferrule includes a pair of recesses to receive the pair of fingers of the second sleeve to prevent a rotation of the elongated member inside the second sleeve.

5. The connector assembly of claim 3, wherein the second sleeve comprises a pair of fingers extending from the tubular portion and biased inwardly of the tubular portion and adapted to move in the radial direction; the fingers of the second sleeve engaging with the elongated member such that the fingers of the second sleeve press against an outer surface of the ferrule to hold the elongated member within the second sleeve, and thereby restrict an easy sliding or turning of the elongated member relative to the second sleeve.

6. The connector assembly of claim 1, wherein the nut member is rotatable within the first sleeve and relative to the elongated member to move the elongated member linearly inside the nut member to adjust a tension of the rope.

7. The connector assembly of claim 1, wherein the cap portion of the nut member includes a torsion applying arrangement, said torsion applying arrangement being adapted to receive a tool to facilitate a rotation of the nut member inside the first sleeve.

8. The connector assembly of claim 7 further including a cover member adapted to be coupled to the cap portion of the nut member to cover the torsion applying arrangement of the cap portion.

9. The connector assembly of claim 7, wherein the torsion applying arrangement includes a plurality of holes spaced apart and extending in a longitudinal direction.

10. The connector assembly of claim 1, wherein the flange portions of the sleeves extend radially outwardly of the tubular portions.

11. The connector assembly of claim 1, wherein each clip of each of the pair of sleeves is connected to the tubular portion of the corresponding sleeve and extends towards the flange portion of the corresponding sleeve in a longitudinal direction.

12. The connector assembly of claim 1, wherein the tubular portion of each sleeve of the pair of sleeves includes a pair of cut-outs to receive the pair of clips of the corresponding sleeve to facilitate an insertion of the tubular portion inside the tubular frame.

\* \* \* \* \*